US012795386B2

(12) United States Patent
Chen

(10) Patent No.: US 12,795,386 B2
(45) Date of Patent: Nov. 10, 2026

(54) METHOD, APPARATUS, ELECTRONIC DEVICE AND STORAGE MEDIUM FOR ESTABLISHING A MOBILE DATA NETWORK

(71) Applicant: Beijing Bytedance Network Technology Co., Ltd., Beijing (CN)

(72) Inventor: Xiangqing Chen, Beijing (CN)

( * ) Notice: Subject to any disclaimer, the term of this patent is extended or adjusted under 35 U.S.C. 154(b) by 367 days.

(21) Appl. No.: 18/292,033

(22) PCT Filed: Jul. 12, 2022

(86) PCT No.: PCT/CN2022/105312

§ 371 (c)(1),
(2) Date: Jan. 25, 2024

(87) PCT Pub. No.: WO2023/045511

PCT Pub. Date: Mar. 30, 2023

(65) Prior Publication Data

US 2024/0349068 A1 Oct. 17, 2024

(30) Foreign Application Priority Data

Sep. 26, 2021 (CN) .......................... 202111128739.7

(51) Int. Cl.
*H04W 16/18* (2009.01)
*H04W 24/02* (2009.01)

(52) U.S. Cl.
CPC ........... *H04W 16/18* (2013.01); *H04W 24/02* (2013.01)

(58) Field of Classification Search
CPC ..... H04W 16/18; H04W 24/02; H04W 60/00; H04W 60/04; Y02D 30/70; H04M 11/06
See application file for complete search history.

(56) References Cited

U.S. PATENT DOCUMENTS

2004/0123130 A1* 6/2004 Mathur .................... H04L 63/20
726/14
2004/0139205 A1* 7/2004 Ichikawa ............ G06F 11/2046
714/E11.073

(Continued)

FOREIGN PATENT DOCUMENTS

CN 102404253 A 4/2012
CN 103092654 A 5/2013

(Continued)

OTHER PUBLICATIONS

Lang et al., "Research on mobile computing architecture," Telecommunications Information, Aug. 2016, (10):3-6, 5 pages (with English abstract).

(Continued)

*Primary Examiner* — Christine Ng
(74) *Attorney, Agent, or Firm* — Fish & Richardson P.C.

(57) ABSTRACT

A method, apparatus, electronic device, storage medium, computer program product and computer program for establishing a mobile data network. The method includes: in accordance with a determination that a mobile data network registration is completed, obtaining a data network activation instruction through a network management service of a framework layer of a first operating system, and sending the data network activation instruction to a modem through a second operating system; performing, based on the data network activation instruction, a mobile data network activation operation through the modem; in accordance with a determination that an activation is completed, obtaining network configuration information through the modem, and sending the network configuration information to the network management service; and establishing, based on the network configuration information, a mobile data network through the network management service.

20 Claims, 4 Drawing Sheets

(56) References Cited

U.S. PATENT DOCUMENTS

| | | | | |
|---|---|---|---|---|
| 2008/0014916 | A1 * | 1/2008 | Chen | H04W 76/18 455/422.1 |
| 2009/0319768 | A1 * | 12/2009 | Ezaki | G06F 9/5077 713/310 |
| 2010/0115512 | A1 * | 5/2010 | Sakai | G06F 9/45533 718/1 |
| 2012/0089992 | A1 * | 4/2012 | Reeves | G09G 5/12 719/318 |
| 2013/0167159 | A1 * | 6/2013 | Ricci | G06F 21/10 719/319 |
| 2014/0043632 | A1 * | 2/2014 | Uchida | G06F 3/1297 358/1.13 |
| 2014/0269553 | A1 * | 9/2014 | Stein | H04M 1/72409 370/329 |
| 2019/0387396 | A1 * | 12/2019 | Gui | H04W 76/14 |
| 2020/0264933 | A1 * | 8/2020 | Zhao | G06F 9/5022 |
| 2021/0092596 | A1 * | 3/2021 | Kudtarkar | H04L 63/20 |
| 2024/0078072 | A1 * | 3/2024 | Zhang | G06F 9/451 |

FOREIGN PATENT DOCUMENTS

| | | | |
|---|---|---|---|
| CN | 103095692 | A | 5/2013 |
| CN | 111198687 | A | 5/2020 |
| CN | 111885589 | A | 11/2020 |
| CN | 113190294 | A | 7/2021 |
| CN | 113840295 | A | 12/2021 |
| WO | 2015051705 | A1 | 4/2015 |
| WO | WO 2013010144 | A2 | 1/2017 |
| WO | 2021057545 | A1 | 4/2021 |

OTHER PUBLICATIONS

Liao et al., “Analysis of Solutions to Linux Real-time Kernel,” Modern Electronics, Jun. 2006, 19:107-109, 4 pages (with English abstract).

Office Action in Chinese Appln. No. 202111128739.7, dated Jul. 15, 2022, 7 pages (with English translation).

Rui F., et al., “The Construction of Learning Social Networking Sites in the Perspective of Connectionism,” Journal of Distance Education, Apr. 18, 2013, Issue 3, pp. 10-16, (English Abstract on p. 16).

International Search Report (with English translation) and Written Opinion issued in PCT/CN2022/105312, dated Sep. 23, 2022, 9 pages provided.

* cited by examiner

METHOD, APPARATUS, ELECTRONIC DEVICE AND STORAGE MEDIUM FOR ESTABLISHING A MOBILE DATA NETWORK

CROSS REFERENCE TO RELATED APPLICATION

The present application claims priority to Chinese Patent Application No. 202111128739.7 filed on Sep. 26, 2021, and entitled "METHOD, APPARATUS, ELECTRONIC DEVICE AND STORAGE MEDIUM FOR ESTABLISHING A MOBILE DATA NETWORK", the entirety of which is incorporated herein by reference.

FIELD

The present disclosure relates to the technical field of computers, and particularly to a method, apparatus, electronic device, storage medium, computer program product and computer program for establishing a mobile data network.

BACKGROUND

Linux operating system can access the Internet through multiple network interfaces, for example, wired Ethernet interface, Wireless Fidelity (Wi-Fi) interface, Modem module data network interface card, etc. However, Modem module data network interface card usually uses Point-to-Point Protocol (PPP) dial-up Internet access to access the Internet, while the data transmission channel of the PPP dial-up Internet access employs low-speed serial port devices, which affects the Internet access rate of the data network interface card, while mobile devices can implement a very high Internet access rate through mobile data cellular networks, i.e., 4G, 5G, and so on. Therefore, a solution based on the Linux operating system is required to access the Internet through mobile data networks.

SUMMARY

The present disclosure provides a method, apparatus, electronic device, storage medium, computer program product and computer program for establishing a mobile data network.

On one hand, the present disclosure provides a method for establishing a mobile data network. According to the method, in accordance with a determination that a mobile data network registration is completed, a data network activation instruction is obtained through a network management service of a framework layer of a first operating system, and the data network activation instruction is sent to a modem through a second operating system. Based on the data network activation instruction, a mobile data network activation operation is performed through the modem. In accordance with a determination that an activation is completed, network configuration information is obtained through the modem, and the network configuration information is sent to the network management service. Based on the network configuration information, a mobile data network is established through the network management service.

On the other hand, the present disclosure provides an apparatus for establishing a mobile data network. The apparatus for establishing the mobile data network comprises a first obtaining module, a network activation module, a second obtaining module, and a network establishment module. The first obtaining module is configured for, in accordance with a determination that a mobile data network registration is completed, obtaining a data network activation instruction through a network management service of a framework layer of a first operating system, and sending the data network activation instruction to a modem through a second operating system. The network activation module is configured for performing, based on the data network activation instruction, a mobile data network activation operation through the modem. The second obtaining module is configured for, in accordance with a determination that an activation is completed, obtaining network configuration information through the modem, and sending the network configuration information to the network management service. The network establishment module is configured for establishing, based on the network configuration information, a mobile data network through the network management service.

According to another aspect of the present disclosure, an electronic device is provided. The electronic device comprises at least one processor and a memory communicated and connected with the at least one processor. The memory stores instructions executable by the at least one processor, and the instructions, when executed by the at least one processor, enable the at least one processor to perform a method of any of embodiments of the present disclosure.

According to another aspect of the present disclosure, non-transitory computer readable storage medium storing computer instructions are provided. The computer instructions cause a computer to perform a method of any of embodiments of the present disclosure.

According to another aspect of the present disclosure, a computer program product comprising a computer program is provided. The computer program, when executed by a processor, implements a method of any of embodiments of the present disclosure.

According to another aspect of the present disclosure, a computer program is provided. The computer program, when executed by a processor, implements a method of any of embodiments of the present disclosure.

The method, apparatus, electronic device, storage medium, computer program product and computer program for establishing a mobile data network are provided in the present disclosure. In accordance with a determination that a mobile data network registration is completed, a data network activation instruction is obtained through a network management service of a framework layer of a first operating system, and the data network activation instruction is sent to a modem through a second operating system. Based on the data network activation instruction, a mobile data network activation operation is performed through the modem. In accordance with a determination that an activation is completed, network configuration information is obtained through the modem, and the network configuration information is sent to the network management service. Based on the network configuration information, a mobile data network is established through the network management service. The technical solution of the present disclosure can access the Internet through the mobile data network based on the first operating system with a fast Internet access rate.

It should be understood that the description in this section is not intended to identify key or important features of embodiments of the present disclosure, nor is it intended to limit the scope of the present disclosure. Other features of the present disclosure will be readily understood by the following description.

BRIEF DESCRIPTION OF THE DRAWINGS

The accompanying drawings are used for a better understanding of the present embodiment and do not constitute a limitation of the present disclosure. Herein.

DETAILED DESCRIPTION

Figure 1:
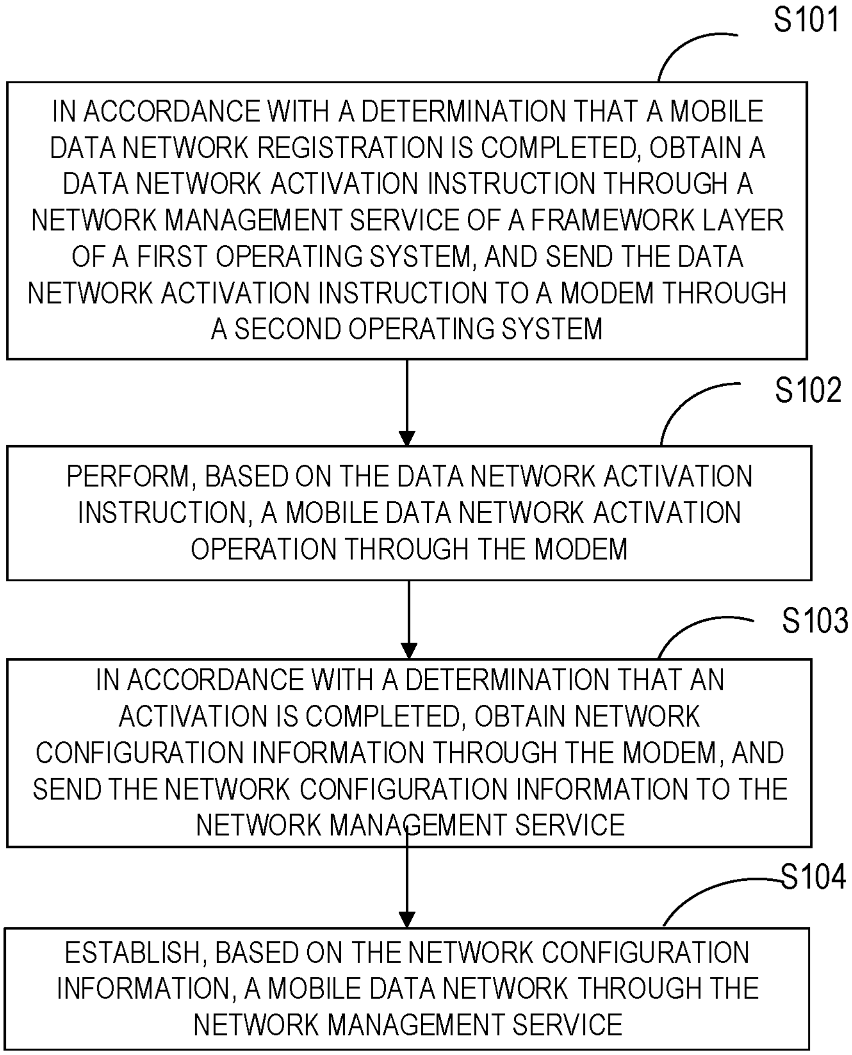
FIG. 1 is a schematic diagram of a method for establishing a mobile data network in an embodiment of the present disclosure.

The following description of exemplary embodiments of the present disclosure, in conjunction with the accompanying drawings, comprises various details of the embodiments of the present disclosure in order to facilitate understanding, and should be considered exemplary only. Accordingly, one of those ordinary skill in the art should appreciate that various changes and modifications can be made to the embodiments described herein without departing from the scope and spirit of the present disclosure. Similarly, descriptions of well-known features and structures have been omitted from the following description for clarity and simplicity.

In the following embodiments, the applicant illustrates the technical problems to be solved by the embodiments of the present invention with the example of a Linux operating system invoking a modem driver of an Android operating system. Those skilled in the art will understand that similar application scenarios, as long as the cross-system driver invoke is implemented by a containerized operating system implemented as a shared operating system kernel, are applicable to the method of the embodiments of the present disclosure.

For example, the first operating system as a host and the second operating system deployed in the first operating system share Linux kernels, which are implemented through technologies such as LXC, containerization, and so on.

For example, the first operating system could be one of the various desktop Linux distributions such as Ubuntu, Debian, RedHat, and so on. It should be noted that the first operating system is not limited to running on a physical machine but can also be an operating system hosted on another operating system, such as WSL in Windows.

For example, the second operating system may be an Android operating system covering the Android OS distributed by Google as well as AOSP and various derivatives of AOSP such as MIUI, EMUI, One UI, etc.

As known to those skilled in the art, there are various other mobile operating systems based on the Linux Kernel that are used to natively support a modem on a device such as a cellular phone, such as Tizen, Hongmeng, Meego, etc., as examples of a second operating system, which are also applicable to the technical solutions of the embodiments of the present invention.

In the following embodiments, the hardware abstraction layer, HAL, is an encapsulation of the operating system kernel driver, which provides a hardware access interface to the various application layer requirements upwards and shields the driver implementation details of the lower hardware layers downwards.

The subject of execution of the present disclosure may be any electronic device, such as, for example, a terminal device, including, but not limited to, a User Equipment (UE), a mobile device, a cellular telephone, a cordless telephone, a Personal Digital Assistant (PDA), a hand-held device, a computing device, an in-vehicle device, a wearable device, etc. In some possible implementations, the method may also be implemented by the processor invoking computer-readable instructions stored in memory.

The technical solution of the present disclosure may be applied to an electronic device, applied to an electronic device comprising a first operating system and a second operating system sharing a kernel with the first operating system and deployed in the first operating system. In the present embodiment, the first operating system is a Linux operating system, and the second operating system is an Android operating system. The Linux operating system implements communication between the Linux operating system and the Android operating system by invoking the Android Modem Hardware Abstract Layer (Android Modem HAL), which in turn implements communication between the Linux operating system and the modem.

In one possible implementation, the specific process of invoking the Modem HAL of the Android operating system by the Linux operating system comprises: sending data from the Linux operating system to the Modem HAL of the Android operating system through the way of the system inter-process communication. Before using the Hwbinder service, pre-registration is required. The transport channel process of Linux operating system is pre-registered as the client of Hwbinder service, and the Android Modem HAL is pre-registered as the server of Hwbinder service. After the registration is completed, communication between the Linux operating system's transport channel process and the Android Modem HAL can be implemented through the Hwbinder service.

Herein, pre-registering a transport channel process of a Linux operating system as a client of the Hwbinder service comprises: creating a first object of the client with a first object creation function; registering the first object into the Hwbinder service with a first object registration function; and configuring a first object invocation function, the first object invocation function being used to invoke the first object for implementing the encoded instruction data transmission. Herein, the first object creation function may be gbinder_client_new; the first object registration function may be gbinder_client_ipc; and the first object invoke function may be gbinder_client_transact.

Herein, pre-registering the Android Modem HAL as a server side of the Hwbinder service comprises: creating a second object on the server with a second object creation function; registering the second object with a Hwbinder service with a second object registration function; configuring a second object invoking function, the second object invoking function being used to invoke the second object to implement the transmission of the encoded instruction data. Herein, the second object creation function may be gbinder_server_new; the second object registration function may be gbinder_server_ipc; and the second object invoke function may be gbinder_server_transact.

In the technical solution of the present disclosure, the Linux operating system can implement the establishment of a mobile data network link by adapting the Android Modem HAL. Through the network management service in the Linux operating system, the Linux operating system is implemented to access the Internet with cellular networks such as 4G, 5G, and so on.

The method for establishing a mobile data network in embodiments of the present disclosure is described in detail below.

FIG. 1 is a schematic diagram of a method for establishing a mobile data network in an embodiment of the present disclosure. As shown in FIG. 1, the method comprises the following steps.

At step S101, in accordance with a determination that a mobile data network registration is completed, an electronic device obtains a data network activation instruction through a network management service of a framework layer of a first operating system, and sends the data network activation instruction to a modem through a second operating system.

In an example where the first operating system is Linux operating system and the second operating system is Android operating system, the terminal device performs mobile data network registration through the modem, and after the registration is completed, the modem sends the registration completion message to the Network management service (e.g., NetworkManager) in the Linux framework layer. The data network activation instruction is generated through the Network management service, or the pre-configured data network activation instruction is read out, and the data network activation instruction is sent to the modem through the Android operating system. Herein, the data network activation instruction is used to activate a mobile data network, which comprises, but is not limited to, cellular networks such as 2G, 3G, 4G, and 5G.

At step S102, the electronic device performs, based on the data network activation instruction, a mobile data network activation operation through the modem.

The terminal device completes the signaling of data network activation through the modem, and the signaling for activating data service is different for 3G network and 4G/5G network; when activating data service under 3G network, the modem sends to the core network the first activation request message: ACTIVATE PDP CONTEXT REQUEST message, and the core network replies after receiving this message with the first activation response message: ACTIVATE PDP CONTEXT ACCEPT message, the modem receives this message and indicates that the data service is activated successfully. When activating the data service in 4G or 5G network, the modem sends to the core network the second activation request message: ACTIVATE DEFAULT EPS BEARER CONTEXT REQUEST message. When the core network receives this message, it replies with the second activation response message: ACTIVATE DEFAULT EPS BEARER CONTEXT ACCEPT message, which is received by the modem to indicate that the activation of the data service is successful, and the activation of the mobile data network is completed.

At step S103, in accordance with a determination that an activation is completed, the electronic device obtains network configuration information through the modem, and sends the network configuration information to the network management service;

The network configuration information is obtained from the core network through the modem and sent to the network management service. The network configuration information comprises, but is not limited to, IP address, gateway address, and Domain Name Server (DNS) address.

At step S104, the electronic device establishes, based on the network configuration information, a mobile data network through the network management service.

The network data network is established in accordance with a determination that the configuration of the network device is completed when the IP address of the network device, the routing table information, and the like of the network device is configured according to the network configuration information by the network management service.

In a specific embodiment, the state information of the network device whose configuration is completed is as the following:

The name of the mobile network device is sipa_eth0, the IP address is 10.93.42.200, the network mask is 255.255.255.0, and the broadcast address is 10.93.42.255, which can be configured to be the default device by means of the default field in the routing table information, so that the network device is selected by default when the upper-layer application accesses the network. The priority of the network device can also be configured through the priority field in the routing table information.

When a browser accesses a web page, it will first detect the currently available network devices, and when it finds that sipa_eth0 is available, the IP packets will be sent and received through sipa_eth0.

The methods for establishing a mobile data network according to embodiments of the present disclosure, in accordance with a determination that a mobile data network registration is completed, obtain a data network activation instruction through a network management service of a framework layer of a first operating system, and send the data network activation instruction to a modem through the network management service; perform, based on the data network activation instruction, a mobile data network activation operation through the modem; in accordance with a determination that an activation is completed, obtain network configuration information through the modem, and send the network configuration information to the network management service; and establish, based on the network configuration information, a mobile data network through the network management service. The technical solution of the present disclosure can implement accessing the Internet through a mobile data network based on the first operating system, with a fast Internet access rate.

In one possible implementation, when sending the data network activation instruction to a modem through a second operating system, the data network activation instruction may be sent to a telephony service of the framework layer of the first operating system through the network management service, the data network activation instruction may be to a modem hardware abstraction layer of the second operating system through the telephony service, and the data network activation instruction may be sent to the modem through the modem hardware abstraction layer.

In an example where the first operating system is the Linux operating system and the second operating system is the Android operating system, the terminal device may send the data network activation instruction to the telephony service in the Linux framework layer through the network management service, send the data network activation instruction to the Android Modem HAL in the Android operating system through the telephony service, send the data network activation instruction to the modem through the Android Modem HAL, and then sends the data network activation instruction to the modem to cause the modem to perform a data network activation operation.

In the embodiments of the present disclosure, the data is sent to the modem through the Android Modem HAL, which avoids the problem of high workload caused by the need to develop multiple interfaces adapted to different Modem drivers in the Linux operating system for directly adapting the Linux operating system to the Modem.

In one possible implementation, sending the data network activation instruction to a telephony service of the framework layer of the first operating system through the network management service comprises: sending the data network activation instruction to the telephony service, by invoking a data bus interface of a connection management module of the telephony service through the network management service.

Taking a Linux operating system as an example of the first operating system, a data bus (e.g., D-Bus) interface of a connection management module of the telephony service can be invoked by the network management service to send data network activation instructions to the telephony service.

In the embodiments of the present disclosure, the data bus interface is used for data sending, which can achieve low latency, low overhead, and high availability.

In one possible implementation, prior to obtaining a data network activation instruction through a network management service of a framework layer of a first operating system, the method further comprises obtaining a data network registration instruction through the telephony service and sending the data network registration instruction to the modem through the second operating system; and performing, based on the data network registration instruction, the mobile data network registration through the modem.

In a practical application, prior to the activation of the mobile data network, the mobile data network registration can be performed through the modem. First, obtain a data network registration instruction through the telephony service, and send the data network registration instruction to the modem; perform, based on the data network registration instruction, the signaling process of data network registration through the modem. The specific registration process may comprise: the modem sending to the core network a registration request message: ATTACH REQUEST message, the core network replying with a registration response message: ATTACH ACCEPT message, and the modem further sending to the core network an activation completion message: ATTACH COMPLETE message, whereupon the status of the modem changes from unregistered state to registered state. After the registration is completed, the mobile data network registration success message is reported to the network management service through the modem, and the data network activation process is initiated through the network management service.

In one possible implementation, obtaining a data network registration instruction through the telephony service comprises:

- in response to a mobile data network turn-on operation, obtaining the data network registration instruction through a mobile data network application; and
- sending the data network registration instruction to the telephony service, by invoking a data bus interface of a network registration module of the telephony service through the mobile data network application.

Taking a Linux operating system as an example of the first operating system, the terminal device can receive the mobile data network turn-on operation through the mobile data network setup interface of the mobile data network application, and generate the data network registration instruction based on the mobile data network turn-on operation, or invoke the pre-configured data network registration instruction, and invoke the data bus interface of the network registration module of the telephony service to send the data network registration instruction to the telephony service.

In the embodiments of the present disclosure, the data bus interface is used for data sending, which can achieve low latency, low overhead, and high availability.

In one possible implementation, sending the data network registration instruction to the modem through the second operating system comprises:

- sending the data network registration instruction to the modem hardware abstraction layer of the second operating system through the telephony service; and
- sending the data network registration instruction to the modem through the modem hardware abstraction layer.

In an example where the first operating system is a Linux operating system and the second operating system is an Android operating system, the data network registration instruction is sent through the telephony service to the Rild process of the RF interface layer of the Android Modem HAL. The Rild process is an application process that can be used to communicate between the Android Modem HAL and the modem.

In one possible implementation, sending the network configuration information to the network management service through the modem comprises:

- sending the network configuration information to the modem hardware abstraction layer through the modem; and
- sending the network configuration information to the network management service through the modem hardware abstraction layer.

In an example where the first operating system is a Linux operating system and the second operating system is an Android operating system as an example, the Linux operating system cannot communicate with the modem directly. Therefore, the Android Modem HAL is a relay, and the modem reports the network configuration information to the network management service through the Android Modem HAL and configures the network device based on the network configuration information through the network management service to complete the establishment of the mobile data network.

Figure 2:
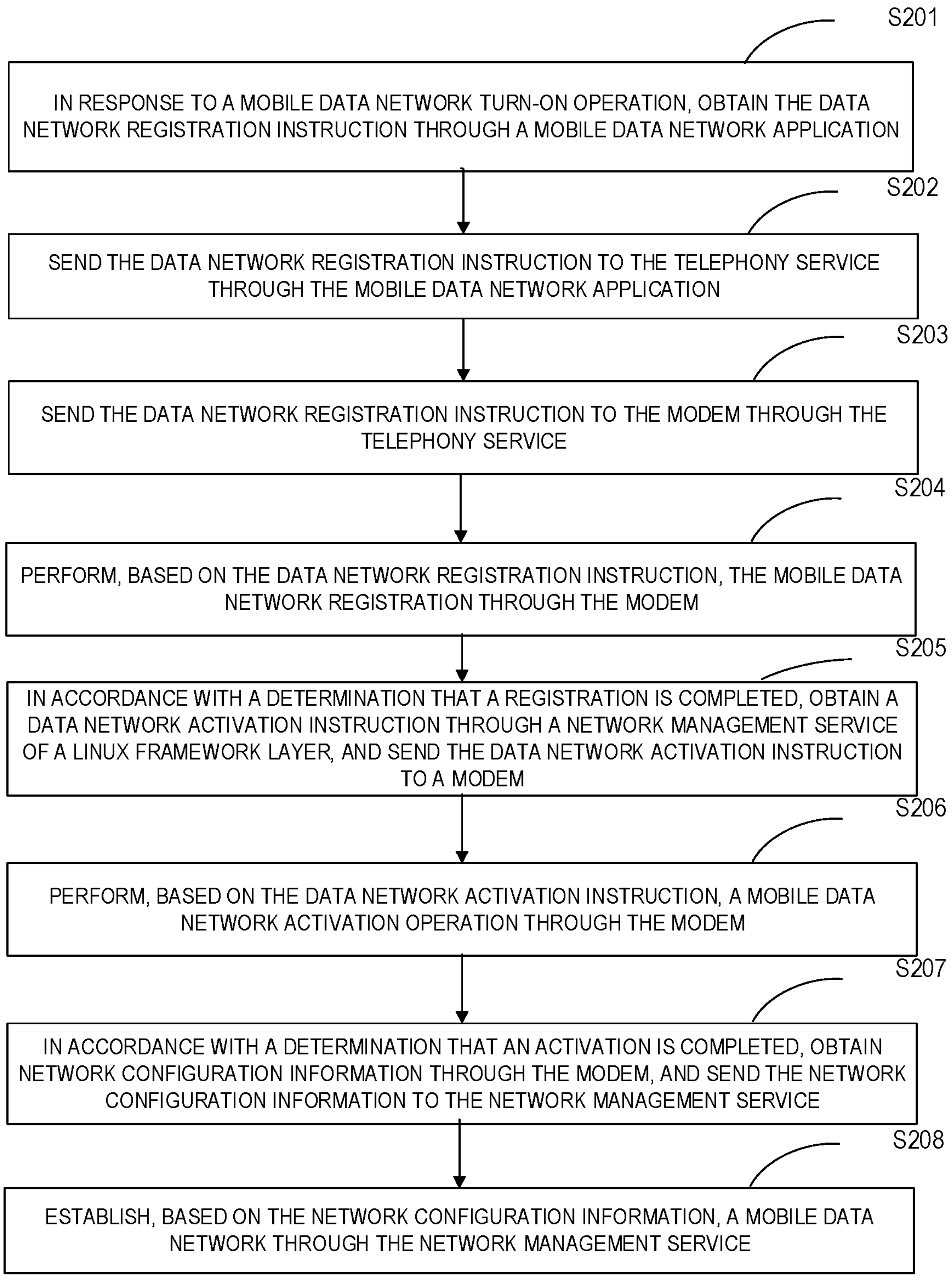
FIG. 2 is a schematic diagram of a method for establishing a mobile data network in an embodiment of the present disclosure.

The following describes the process of implementing the method of establishing a mobile data network in the present disclosure by means of a specific embodiment. FIG. 2 is a schematic diagram of a method for establishing a mobile data network in an embodiment of the present disclosure, where the first operating system is a Linux operating system, and the second operating system is an Android operating system.

As shown in FIG. 2, the method of the present embodiment comprises the following steps.

At step S201, in response to a mobile data network turn-on operation, an electronic device obtains the data network registration instruction through a mobile data network application.

At step S202, the electronic device sends the data network registration instruction to the telephony service through the mobile data network application.

At step S203, the electronic device sends the data network registration instruction to the modem through the telephony service.

At step S204, the electronic device performs, based on the data network registration instruction, the mobile data network registration through the modem.

At step S205, in accordance with a determination that a registration is completed, an electronic device obtains a data network activation instruction through a network management service of a Linux framework layer, and sends the data network activation instruction to a modem.

At step S206, the electronic device performs, based on the data network activation instruction, a mobile data network activation operation through the modem.

At step S207, in accordance with a determination that an activation is completed, the electronic device obtains network configuration information through the modem, and sends the network configuration information to the network management service.

At step S208, the electronic device establishes, based on the network configuration information, a mobile data network through the network management service.

The methods for establishing a mobile data network provided by the present disclosure, in accordance with a determination that a mobile data network registration is completed, obtain a data network activation instruction through a network management service of a Linux framework layer, and send the data network activation instruction to a modem through the network management service; perform, based on the data network activation instruction, a mobile data network activation operation through the modem, and in accordance with a determination that an activation is completed, obtain network configuration information through the modem, and send the network configuration information to the network management service; establish, based on the network configuration information, a mobile data network through the network management service. The technical solution of the present disclosure can implement access to the Internet through a mobile data network based on a Linux operating system with a fast Internet access rate.

Figure 3:
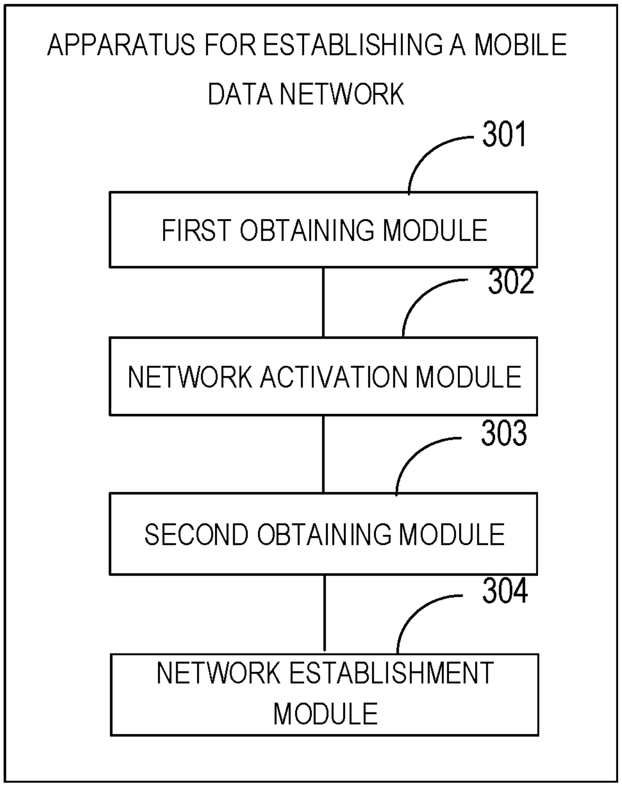
FIG. 3 is a schematic diagram of an apparatus for establishing a mobile data network in an embodiment of the present disclosure.

FIG. 3 is a schematic diagram of an apparatus for establishing a mobile data network in an embodiment of the present disclosure. As shown in FIG. 3, the apparatus comprises a first obtaining module 301, a network activation module 302, a second obtaining module 303, and a network establishment module 304.

The first obtaining module 301 is configured for, in accordance with a determination that a mobile data network registration is completed, obtaining a data network activation instruction through a network management service of a framework layer of a first operating system, and sending the data network activation instruction to a modem through a second operating system;

The network activation module 302 is configured for performing, based on the data network activation instruction, a mobile data network activation operation through the modem;

The second obtaining module 303 is configured for, in accordance with a determination that an activation is completed, obtaining network configuration information through the modem, and sending the network configuration information to the network management service; and The network establishment module 304 is configured for establishing, based on the network configuration information, a mobile data network through the network management service.

The apparatuses for establishing a mobile data network provided in the embodiments of the present disclosure, in accordance with a determination that a mobile data network registration is completed, obtain a data network activation instruction through a network management service of a framework layer of a first operating system, and send the data network activation instruction to a modem through a second operating system; perform, based on the data network activation instruction, a mobile data network activation operation through the modem; in accordance with a determination that an activation is completed, obtain network configuration information through the modem, and send the network configuration information to the network management service; and establish, based on the network configuration information, a mobile data network through the network management service. The technical solution of the present disclosure can access the Internet through the mobile data network based on the first operating system with a fast Internet access rate.

In one possible implementation, the first obtaining module 301, in accordance with a determination that the data network activation instruction is sent to a modem through a second operating system, is configured for: sending the data network activation instruction to a telephony service of the framework layer of the first operating system through the network management service; sending the data network activation instruction to a modem hardware abstraction layer of the second operating system through the telephony service; and sending the data network activation instruction to the modem through the modem hardware abstraction layer.

In one possible implementation, the first obtaining module 301, in accordance with a determination that the data network activation instruction is sent to a telephony service of the framework layer of the first operating system through the network management service, is configured for: sending the data network activation instruction to the telephony service, by invoking a data bus interface of a connection management module of the telephony service through the network management service.

In one possible implementation, the apparatus further comprises a network registration module configured for: obtaining a data network registration instruction through the telephony service and sending the data network registration instruction to the modem through the second operating system; and performing, based on the data network registration instruction, the mobile data network registration through the modem.

In one possible implementation, the network registration module, in accordance with a determination that a data network registration instruction is obtained through the telephony service, is configured for: in response to a mobile data network turn-on operation, obtaining the data network registration instruction through a mobile data network application; and sending the data network registration instruction to the telephony service, by invoking a data bus interface of a network registration module of the telephony service through the mobile data network application.

In one possible implementation, the network registration module, in accordance with a determination that the data network registration instruction is sent to the modem through the second operating system, is configured for: sending the data network registration instruction to the modem hardware abstraction layer of the second operating system through the telephony service; and sending the data network registration instruction to the modem through the modem hardware abstraction layer.

In one possible implementation, the second obtaining module 303, in accordance with a determination that the network configuration information is sent to the network management service through the modem, is configured for:

sending the network configuration information to the modem hardware abstraction layer through the modem; and sending the network configuration information to the network management service through the modem hardware abstraction layer.

The functions of each unit, module, or sub-module in each apparatus of the embodiments of the present disclosure can be found in the corresponding descriptions in the method embodiments described above and will not be repeated herein.

According to embodiments of the present disclosure, the present disclosure also provides an electronic device, a readable storage medium, a computer program product, and a computer program.

Figure 4:
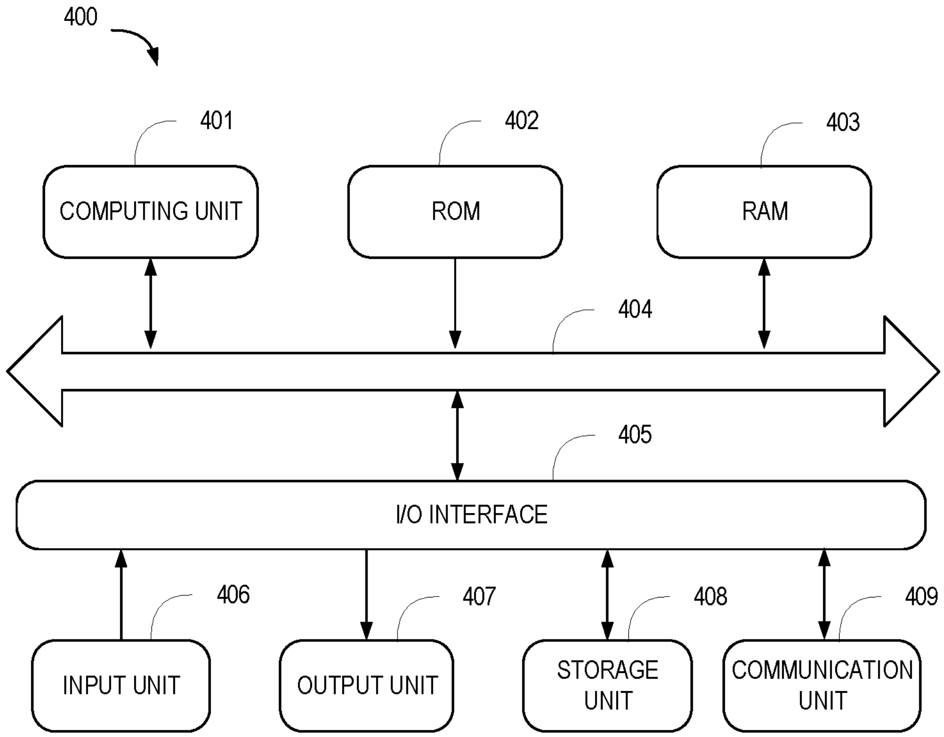
FIG. 4 is a block diagram of an electronic device for implementing a method for establishing a mobile data network of the present disclosure.

FIG. 4 is a block diagram of an electronic device for implementing a method for establishing a mobile data network of the present disclosure. Electronic devices are intended to represent various forms of digital computers, such a laptop computer, desktop computers, workbenches, personal digital assistants, servers, blade servers, mainframe computers, and other suitable computers. Electronic devices may also represent various forms of mobile devices, such as, personal digital processing, cellular phones, smart phones, wearable devices, and other similar computing devices. The components shown herein, their connections and relationships, and their functionality are shown as examples only and are not intended to limit the implementations of the present disclosure described and/or claimed herein.

As shown in FIG. 4, the electronic device 400 comprises a computing unit 401, which can perform various appropriate actions and processes based on computer programs stored in Read-Only Memory (ROM) 402 or loaded from storage unit 408 into Random Access Memory (RAM) 403. In RAM 403, various programs and data required for the operation of the electronic device 400 can also be stored. The computing unit 401, ROM 402, and RAM 403 are connected to each other through a bus 404. The input/output (I/O) interface 405 is also connected to the bus 404.

A plurality of components in the electronic device 400 are connected to the I/O interface 405, comprising: an input unit 406, such as a keyboard, mouse, etc.; an output unit 407, such as various types of displays, speakers, etc.; a storage unit 408, such as disks, optical disks, etc.; and a communication unit 409, such as a network interface card, modem, wireless communication transceiver, etc. The communication unit 409 allows the electronic device 400 to exchange information/data with other devices via a computer network such as the Internet and/or various telecommunications networks.

The computing unit 401 may be a variety of general purpose and/or specialized processing components with processing and computational capabilities. Some examples of the computing unit 401 comprise, but are not limited to, a Central Processing Unit (CPU), a Graphic Processing Unit (GPU), various specialized Artificial Intelligence (AI) computing chips, various computing units running Machine Learning model algorithms, Digital Signal Processing (DSP), and any suitable processors, controllers, microcontrollers, etc. The computing unit 401 performs the various methods and processes described above, such as the method for establishing a mobile data network. For example, in some embodiments, the method for establishing a mobile data network can be implemented as a computer software program that is tangibly included on a machine-readable medium, such as storage unit 408. In some embodiments, some or all of the computer programs may be loaded and/or installed onto the electronic device 400 via the ROM 402 and/or the communication unit 409. When the computer program is loaded into the RAM 403 and executed by the computing unit 401, one or more steps of the method for establishing a mobile data network described above may be performed. Alternatively, in other embodiments, the computing unit 401 may be configured to perform the method for establishing a mobile data network by any other suitable means (e.g., with the aid of firmware).

Various implementations of the systems and techniques described above herein can be found in digital electronic circuit systems, integrated circuit systems, Field Programmable Gate Arrays (FPGAs), Application Specific Integrated Circuits (ASICs), Application Specific Standard Products (ASSPs), System on a Chips (SOCs), Complex Programmable Logic Devices (CPLDs), computer hardware, firmware, software, and/or combinations thereof. These various implementations may comprise: implementation in one or more computer programs, the one or more computer programs being executable and/or interpretable on a programmable system comprising at least one programmable processor. The programmable processor, which may be a dedicated or general-purpose programmable processor, may receive data and instructions from the storage system, the at least one input device, and the at least one output device, and transmit the data and instructions to the storage system, the at least one input device, and the at least one output device.

Program code for performing the methods of the present disclosure may be written in any combination of one or more programming languages. Such program code may be provided to a processor or controller of a general-purpose computer, special-purpose computer, or other programmable data processing device such that the program code when executed by the processor or controller causes the functions/operations specified in the flowchart and/or block diagram to be implemented. The program code may be executed entirely on the machine, partially on the machine, partially on the machine as a stand-alone software package and partially on a remote machine or entirely on a remote machine or server.

In the context of the present disclosure, a machine-readable medium may be a tangible medium that may include or store a program for use by or in conjunction with an instruction execution system, device, or apparatus. The machine-readable medium may be a machine-readable signal medium or a machine-readable storage medium. The machine-readable medium may comprise, but is not limited to, an electronic, magnetic, optical, electromagnetic, infrared, or semiconductor system, device, or apparatus, or any suitable combination of the foregoing. More specific examples of machine-readable storage media would comprise an electrical connection based on one or more wires, a portable computer disk, a hard disk, a random-access memory (RAM), a read-only memory (ROM), an Electrical Programmable ROM (EPROM, or flash memory), a fiber-optic optic, a convenient compact disc read-only memory (CDROM), an optical storage device, a magnetic storage device, or any suitable combination of the foregoing.

In order to provide interaction with the user, the systems and techniques described herein may be implemented on a computer having: a display apparatus (such as a Cathode Ray Tube (CRT) or Liquid Crystal Display (LCD) monitor) for displaying information to the user; and a keyboard and pointing apparatus (such as a mouse or trackball), through which the user can provide input to the computer. Other types of devices may further be used to provide interaction with the user; for example, the feedback provided to the user may be any form of sensory feedback (e.g., visual feedback, auditory feedback, or haptic feedback); and the input from the user may be received in any form (comprising acoustic input, voice input, or haptic input).

The systems and techniques described herein may be implemented in a computing system comprising a back-end component (e.g., as a data server), or a computing system comprising a middleware component (e.g., an application server), or a computing system comprising a front-end component (e.g., a user computer with a graphical user interface (GUI) or a web browser through which a user can interact with the implementation of the systems and techniques described herein), or any combination of such back-end, middleware, or front-end components. The components of the system may be interconnected by digital data communications (e.g., a communications network) in any form or medium. Examples of communication networks comprise a Local Area Network (LAN), a Wide Area Network (WAN), and the Internet.

A computer system may comprise a client and a server. Clients and servers are generally remote from each other and usually interact over a communication network. The client-server relationship is generated by computer programs that run on corresponding computers and have a client-server relationship with each other.

It should be understood that steps may be reordered, added, or deleted using various forms of the processes shown above. For example, the steps documented in the present disclosure may be executed in parallel or sequentially or in a different order, as long as they implement the desired results of the technical solutions disclosed in the present disclosure and are not limited herein.

The above specific embodiments do not constitute a limitation on the scope of protection of the present disclosure. It should be appreciated by those skilled in the art that various modifications, combinations, sub-combinations, and substitutions may be made based on design requirements and other factors. Any modifications, equivalent substitutions, improvements, etc. made within the spirit and principles of the present disclosure shall be included within the scope of protection of the present disclosure.

I claim:

1. A method for establishing a mobile data network, comprising:

in accordance with a determination that a mobile data network registration is completed, obtaining, at an electronic device, a data network activation instruction through a network management service of a framework layer of a first operating system, and sending the data network activation instruction to a modem through a second operating system, the electronic device comprising the first operating system and the second operating system sharing a kernel with the first operating system and deployed in the first operating system;

performing, based on the data network activation instruction, a mobile data network activation operation through the modem;

in accordance with a determination that an activation is completed, obtaining network configuration information through the modem, and sending the network configuration information to the network management service; and establishing, based on the network configuration information, the mobile data network through the network management service.

2. The method of claim 1, wherein the sending the data network activation instruction to a modem through a second operating system comprises:

sending the data network activation instruction to a telephony service of the framework layer of the first operating system through the network management service;

sending the data network activation instruction to a modem hardware abstraction layer of the second operating system through the telephony service; and sending the data network activation instruction to the modem through the modem hardware abstraction layer.

3. The method of claim 2, wherein the sending the data network activation instruction to a telephony service of the framework layer of the first operating system through the network management service comprises:

sending the data network activation instruction to the telephony service, by invoking a data bus interface of a connection management module of the telephony service through the network management service.

4. The method of claim 1 wherein prior to obtaining a data network activation instruction through a network management service of a framework layer of a first operating system, the method further comprises:

obtaining a data network registration instruction through a telephony service of the framework layer of the first operating system and sending the data network registration instruction to the modem through the second operating system; and performing, based on the data network registration instruction, the mobile data network registration through the modem.

5. The method of claim 4, wherein the obtaining a data network registration instruction through the telephony service comprises:

in response to a mobile data network turn-on operation, obtaining the data network registration instruction through a mobile data network application; and sending the data network registration instruction to the telephony service, by invoking a data bus interface of a network registration module of the telephony service through the mobile data network application.

6. The method of claim 4, wherein the sending the data network registration instruction to the modem through the second operating system comprises:

sending the data network registration instruction to a modem hardware abstraction layer of the second operating system through the telephony service; and sending the data network registration instruction to the modem through the modem hardware abstraction layer.

7. The method of claim 1 wherein sending the network configuration information to the network management service comprises:

sending the network configuration information to a modem hardware abstraction layer of the second operating system through the modem; and sending the network configuration information to the network management service through the modem hardware abstraction layer.

8. An electronic device, comprising:

at least one processor; and a memory communicated and connected with the at least one processor;

wherein, the memory stores instructions executable by the at least one processor, the instructions, when executed by the at least one processor, enables the at least one processor to perform a method comprising:

in accordance with a determination that a mobile data network registration is completed, obtaining a data network activation instruction through a network management service of a framework layer of a first operating system, and sending the data network activation instruction to a modem through a second operating system, the electronic device comprising the first operating system and the second operating system sharing a kernel with the first operating system and deployed in the first operating system;

performing, based on the data network activation instruction, a mobile data network activation operation through the modem;

in accordance with a determination that an activation is completed, obtaining network configuration information through the modem, and sending the network configuration information to the network management service; and establishing, based on the network configuration information, a mobile data network through the network management service.

9. The electronic device of claim 8, wherein the sending the data network activation instruction to a modem through a second operating system comprises:

sending the data network activation instruction to a telephony service of the framework layer of the first operating system through the network management service;

sending the data network activation instruction to a modem hardware abstraction layer of the second operating system through the telephony service; and sending the data network activation instruction to the modem through the modem hardware abstraction layer.

10. The electronic device of claim 9, wherein the sending the data network activation instruction to a telephony service of the framework layer of the first operating system through the network management service comprises:

sending the data network activation instruction to the telephony service, by invoking a data bus interface of a connection management module of the telephony service through the network management service.

11. The electronic device of claim 8, wherein prior to obtaining a data network activation instruction through a network management service of a framework layer of a first operating system, the method further comprises:

obtaining a data network registration instruction through a telephony service of the framework layer of the first operating system and sending the data network registration instruction to the modem through the second operating system; and performing, based on the data network registration instruction, the mobile data network registration through the modem.

12. The electronic device of claim 11, wherein the obtaining a data network registration instruction through the telephony service comprises:

in response to a mobile data network turn-on operation, obtaining the data network registration instruction through a mobile data network application; and sending the data network registration instruction to the telephony service, by invoking a data bus interface of a network registration module of the telephony service through the mobile data network application.

13. The electronic device of claim 11, wherein the sending the data network registration instruction to the modem through the second operating system comprises:

sending the data network registration instruction to a modem hardware abstraction layer of the second operating system through the telephony service; and sending the data network registration instruction to the modem through the modem hardware abstraction layer.

14. The electronic device of claim 8, wherein sending the network configuration information to the network management service comprises:

sending the network configuration information to a modem hardware abstraction layer of the second operating system through the modem; and sending the network configuration information to the network management service through the modem hardware abstraction layer.

15. A non-transitory computer readable storage medium storing computer instructions, wherein the computer instructions cause a computer to perform a method comprising:

in accordance with a determination that a mobile data network registration is completed, obtaining a data network activation instruction through a network management service of a framework layer of a first operating system, and sending the data network activation instruction to a modem through a second operating system;

performing, based on the data network activation instruction, a mobile data network activation operation through the modem;

in accordance with a determination that an activation is completed, obtaining network configuration information through the modem, and sending the network configuration information to the network management service; and establishing, based on the network configuration information, a mobile data network through the network management service.

16. The non-transitory computer readable storage medium of claim 15, wherein the sending the data network activation instruction to a modem through a second operating system comprises:

sending the data network activation instruction to a telephony service of the framework layer of the first operating system through the network management service;

sending the data network activation instruction to a modem hardware abstraction layer of the second operating system through the telephony service; and sending the data network activation instruction to the modem through the modem hardware abstraction layer.

17. The non-transitory computer readable storage medium of claim 16, wherein the sending the data network activation instruction to a telephony service of the framework layer of the first operating system through the network management service comprises:

sending the data network activation instruction to the telephony service, by invoking a data bus interface of a connection management module of the telephony service through the network management service.

18. The non-transitory computer readable storage medium of claim 15, wherein prior to obtaining a data network activation instruction through a network management service of a framework layer of a first operating system, the method further comprises:

obtaining a data network registration instruction through a telephony service of the framework layer of the first operating system and sending the data network registration instruction to the modem through the second operating system; and performing, based on the data network registration instruction, the mobile data network registration through the modem.

19. The non-transitory computer readable storage medium of claim 18, wherein the obtaining a data network registration instruction through the telephony service comprises:

in response to a mobile data network turn-on operation, obtaining the data network registration instruction through a mobile data network application; and sending the data network registration instruction to the telephony service, by invoking a data bus interface of a network registration module of the telephony service through the mobile data network application.

20. The non-transitory computer readable storage medium of claim 18, wherein the sending the data network registration instruction to the modem through the second operating system comprises:

sending the data network registration instruction to a modem hardware abstraction layer of the second operating system through the telephony service; and sending the data network registration instruction to the modem through the modem hardware abstraction layer.

* * * * *